US012633803B2

(12) United States Patent
Kondo et al.

(10) Patent No.: US 12,633,803 B2
(45) Date of Patent: May 19, 2026

(54) STATOR OF ROTATING ELECTRICAL MACHINE

(71) Applicants: DENSO CORPORATION, Kariya (JP); AISIN CORPORATION, Aichi (JP); TOYOTA JIDOSHA KABUSHIKI KAISHA, Toyota (JP)

(72) Inventors: Keiji Kondo, Kariya (JP); Tatsuya Fujita, Kariya (JP); Junichi Sugawara, Kariya (JP); Yoshihiro Takahara, Toyota (JP)

(73) Assignees: DENSO CORPORATION, Kariya (JP); AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 335 days.

(21) Appl. No.: 18/113,468

(22) Filed: Feb. 23, 2023

(65) Prior Publication Data

US 2023/0283149 A1 Sep. 7, 2023

(30) Foreign Application Priority Data

Mar. 1, 2022 (JP) ................................. 2022-031326

(51) Int. Cl.
*H02K 9/22* (2006.01)
*H02K 1/16* (2006.01)
*H02K 9/02* (2006.01)

(52) U.S. Cl.
CPC ................. *H02K 9/22* (2013.01); *H02K 1/16* (2013.01); *H02K 9/02* (2013.01)

(58) Field of Classification Search
CPC .. H02K 3/30; H02K 3/32; H02K 3/38; H02K 3/50–3/525; H02K 9/22; H02K 9/19

USPC .................................................. 310/260, 270
See application file for complete search history.

(56) References Cited

U.S. PATENT DOCUMENTS 6,952,070 B1 * 10/2005 Kaminski ................ H02K 3/51
310/64
8,525,376 B2 * 9/2013 Neje ......................... H02K 3/24
310/270
2001/0045782 A1 * 11/2001 Lieu ........................ H02K 15/12
310/67 R (Continued)

FOREIGN PATENT DOCUMENTS

CN 102474159 A * 5/2012 ............... H02K 3/24
DE 102019117832 A1 * 1/2021

(Continued)

OTHER PUBLICATIONS

Machine Translation of JP 2003332512 A (Year: 2003).*

(Continued)

*Primary Examiner* — Christopher M Koehler
(74) *Attorney, Agent, or Firm* — Oliff PLC

(57) ABSTRACT

A stator for a rotating electrical machine includes a stator core, a stator winding disposed on or in the stator core, and an annular resinous seal which covers an axial end portion of a coil end of the stator winding. The resinous seal has an inner circumferential surface which is shaped to have a first inner diameter close to the stator core and a second inner diameter farther away from the stator core. The first inner diameter is selected to be smaller than the second inner diameter. This ensures the stability of electrical insulation of the stator winding.

8 Claims, 13 Drawing Sheets

(56)          References Cited

U.S. PATENT DOCUMENTS

| | | | |
|---|---|---|---|
| 2002/0153784 A1 | 10/2002 | Kanppenberger | |
| 2004/0108784 A1* | 6/2004 | Higashino | H02K 3/38 |
| | | | 310/179 |
| 2008/0129131 A1* | 6/2008 | Shin | H02K 3/522 |
| | | | 310/71 |
| 2010/0038981 A1* | 2/2010 | Urano | H02K 9/227 |
| | | | 310/64 |
| 2013/0106238 A1* | 5/2013 | Saiki | H02K 15/24 |
| | | | 310/260 |
| 2014/0070639 A1* | 3/2014 | Tamura | H02K 9/19 |
| | | | 310/54 |
| 2019/0157949 A1 | 5/2019 | Kawai et al. | |
| 2020/0195108 A1* | 6/2020 | Yamaji | H02K 7/006 |

FOREIGN PATENT DOCUMENTS

| | | | | |
|---|---|---|---|---|
| JP | S54-14301 | U | | 1/1979 |
| JP | 2003332512 | A | * | 11/2003 |
| JP | 2017-189058 | A | | 10/2017 |
| JP | 2018-068068 | A | | 4/2018 |
| JP | 2018121491 | A | * | 8/2018 |
| JP | 2019075854 | A | * | 5/2019 |
| JP | 2019-097234 | A | | 6/2019 |

OTHER PUBLICATIONS

Machine Translation of JP 2018121491 A (Year: 2018).*
Machine Translation of JP 2019075854 (Year: 2019).*
Machine Translation of CN 102474159 A (Year: 2012).*
Machine Translation of DE 102019117832 A1 (Year: 2021).*

* cited by examiner

STATOR OF ROTATING ELECTRICAL MACHINE

CROSS REFERENCE TO RELATED DOCUMENT

The present application claims the benefit of priority of Japanese Patent Application No. 2022-031326 filed on Mar. 1, 2022, the disclosure of which is incorporated in its entirety herein by reference.

BACKGROUND

1 Technical Field

This disclosure relates generally to a stator of a rotating electrical machine.

2 Background Art

Japanese Patent First Publication No. 2018-121491 discloses a rotating electrical machine which is equipped with a stator. The stator has a stator core around which a stator winding is wound. The stator winding has coil ends one of which is equipped with an annular resinous seal. The resinous seal is made from insulating resin and encapsulates an axial tip of the coil end.

The stator winding includes conductor segments which constitute the coil ends and extend from outside the stator core into slots formed in the end of the stator core. The resinous seal and the conductor segments are, therefore, juxtaposed above the coil end, thus requiring the resinous seal to have a decreased thickness. This leads to a risk that when a radially inner circumference of the resinous seal is subjected to a thermal stress resulting from a rise in temperature of the stator core, so that it thermally expands, it may cause a portion of the resinous seal which faces the end of the stator core to be thermally distorted, so that it cracks, which may result in a reduction of insulation of the conductor segments of the stator winding.

SUMMARY

This disclosure was made in view of the above problems. It is an object to provide a stator of a rotating electrical machine which ensures the stability in electrical insulation of a stator winding.

According to one aspect of this disclosure, there is provided a stator for a rotating electrical machine which comprises: (a) a stator core; (b) a stator winding which is disposed on or in the stator core and has a coil end exposed outside an end of the stator core; and (c) a resinous seal which is in an annular shape and covers an axial end portion of the coil end with an insulating resin. The resinous seal has an inner circumferential surface facing radially inward thereof. The inner circumferential surface is shaped to have a first inner diameter close to the stator core and a second inner diameter farther away from the stator core. The first inner diameter is smaller than the second inner diameter.

In the above structure, the inner circumferential surface of the resinous seal is, as described above, shaped to have the first inner diameter closer to the stator core and the second inner diameter farther away from the stator core. The first inner diameter is selected to be smaller than the second inner diameter, thereby resulting in an increase in thickness or volume of a radially inner portion of the insulating resin which is also close to the end surface of the resinous seal which faces the stator core. This eliminates or minimizes a risk that the insulating resin of the resinous seal may expand due to exposure to high-temperature stress when the temperature of the stator is increasing, which would result in thermal distortion of a radially inner portion of the insulting resin near the end surface of the resinous seal facing the stator core to induce cracks in that portion. This ensures the stability in insulation of conductors of the stator winding within the resinous seal to secure a required degree of insulation of the stator winding.

In the preferred mode of the stator, the resinous seal may have an outer circumferential surface facing radially outward thereof. The outer circumferential surface may be shaped to have a first outer diameter close to the stator core and a second outer diameter farther away from the stator core. The first outer diameter is larger than the second outer diameter.

The outer circumferential surface of the resinous seal, as described above, may be shaped to have the first outer diameter closer to the stator core and the second outer diameter farther away from the stator core. The first outer diameter is selected to be larger than the outer diameter, thereby resulting in an increase in thickness or volume of a radially outer portion of the insulating resin which is also close to an end surface of the resinous seal which faces the stator core. This minimizes a risk that cracks may occur in a radially outer portion of the insulating resin near the end surface of the resinous seal facing the stator core due to shrinkage of the insulating resin arising from a low-temperature stress when the temperature of the stator is decreasing. This also ensures the stability in insulation of conductors of the stator winding within the resinous seal.

In brief, the above structure of the resinous seal serves to avoid generation of cracks both in the radially inner portion of the resinous seal close to the stator core due to the exposure to a high-temperature stress and in the radially outer portion of the resinous seal close to the stator core due to the exposure to a low-temperature stress. This keeps the electrical insulation of the stator winding at a required level.

In the preferred mode of the stator, the stator may be disposed in a rotating electrical machine which is placed with an axial direction thereof oriented in a substantially horizontal direction. The stator may be configured to have the coil end which is cooled by a cooling medium delivered from above in a vertical direction toward the coil end. The inner circumferential surface of the resinous seal is inclined obliquely in a form of a slant surface to extend from an edge of the resinous seal, as facing away from the stator core, close to a center axis of the stator core. The resinous seal has an outer surface which faces away from the stator core and has formed thereon or therein a protrusion or a recess serving as a heat dissipator.

In the above arrangements, when the rotating electrical machine is mounted in place, annular shaped planes of the coil end and the resinous seal oriented vertically. The inner circumferential surface of the resinous seal is in the shape of an oblique surface which is inclined to have a first portion close to the stator core and a second portion farther away from the stator core. The first portion is closer to the axis of the stator core than the second portion is. Such a configuration of the inner circumferential surface of the resinous seal causes the cooling medium which has been delivered to the inner circumferential surface to flow along the slope of the inner circumferential surface to a portion of the resinous seal which is remote from the stator core. The resinous seal, as described above, has the outer surface which is remote from the stator core and serves as a heat dissipating surface with the protrusion or the recess. When the cooling medium passes the heat dissipating surface, the resinous seal works to release thermal energy, as transmitted from the stator winding, to the cooling medium, thereby alleviating the thermal stress to which the resinous seal is subjected, thereby minimizing a risk of occurrence of cracks in the resinous seal.

In the preferred mode of the stator, the resinous seal may be designed to have an end surface which faces the stator core and has protrusions formed on a radially inner edge and a radially outer edge which protrude toward the stator core and extend in a circumferential direction of the resinous seal.

In the above structure, the end surface of the resinous seal which faces the stator core, as described above, has the protrusions arranged on two radially opposed portions: a radially inner portion and a radially outer portion of the resinous seal. The protrusions face the stator core and serve to hold the cooling medium, as flowing through a gap between the resinous seal and the stator core, from escaping outside the gap, thereby ensuring the stability in delivering the cooling medium over the entire circumference of the resinous seal to facilitate accumulation of the cooling medium around the resinous seal to enhance the cooling efficiency in the resinous seal.

In the preferred mode, the stator may also include a bus bar which connects with the coil end of the stator winding and is arranged to face the coil end in a radial direction of the stator winding. The resinous seal is configured to have a bus bar-sealing portion which covers the coil end and the bus bar using the insulating resin. The bus bar-sealing portion has formed in or on an outer surface thereof a protrusion or a recess serving as a heat dissipator.

In the above structure, the resinous seal, as described above, covers the coil end and the bus bar with the insulating resin. The resinous seal has the protrusion or the recess which is formed on or in the outer surface of the bus bar-sealing portion and works as the heat dissipator. The bus bar is arranged radially face the coil end, thereby enhancing the dissipation of heat from a portion of the resinous seal other than that covering the coil end.

In the preferred mode of the stator, the inner circumferential surface of the resinous seal is shaped to have formed thereon a plurality of protrusions which bulge radially inward and are arranged at a given interval away from each other in the circumferential direction of the resinous seal.

The protrusions on the inner circumferential surface function to spread spreads elastic deformation of the resinous seal, as arising from the thermal stress thereon, in the circumferential direction as well as in the radial direction of the resinous seal, thereby minimizing a risk of occurrence of cracks in the end surface of the resinous seal which faces the stator core.

In the preferred mode of the stator, the inner circumferential surface of the resinous seal may be formed in a wave-shape with curved concave and convex portions which are arranged alternately.

The wave-shape of the inner circumferential surface of the resinous seal function to spread elastic deformation of the resinous seal, as arising from the thermal stress thereon, in the circumferential direction as well as in the radial direction of the resinous seal, thereby minimizing a risk of occurrence of cracks in the end surface of the resinous seal which faces the stator core. The wave shape also minimizes a risk of breakage of the resinous seal arising from the concentration of stress on the inner circumferential surface.

BRIEF DESCRIPTION OF THE DRAWINGS

The present disclosure will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 3 is a plan view of a stator core of the stator illustrated in FIG. 1;

FIGS. 12(*a*), 12(*b*), 12(*c*), and 12(*d*) are partial sectional views which illustrate modified forms of a neutral bus bar disposed inside a resinous seal.

DESCRIPTION OF THE PREFERRED EMBODIMENT

A rotating electrical machine in an embodiment will be described below with reference to the drawings. Parts of the embodiments and modifications functionally or structurally corresponding to each other or associated with each other will be denoted by the same reference numbers for the brevity of explanation. Explanation of the parts denoted by the same reference numbers will be omitted. The rotating electrical machine in the embodiment is designed as an electrical motor which may be used in wheeled vehicles or aerial vehicles.

Figure 1:
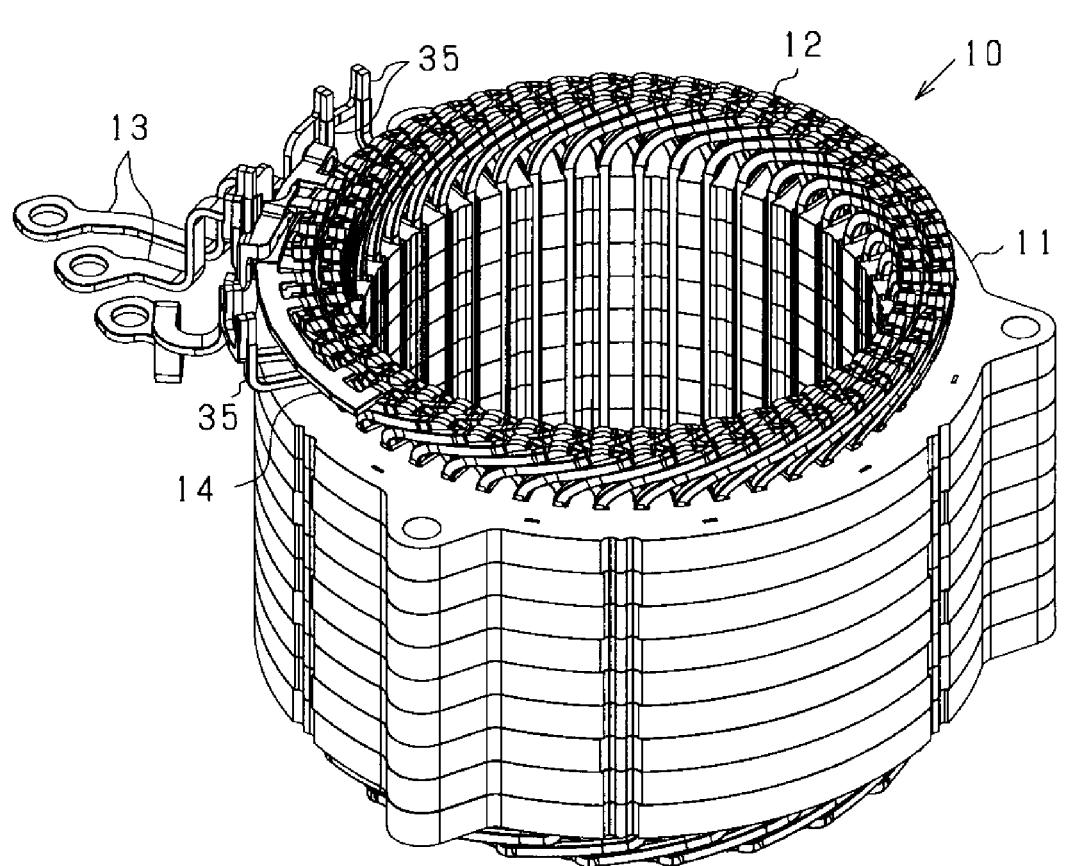
FIG. 1 is a perspective view which illustrates a stator according to an embodiment.

The rotating electrical machine in this embodiment is equipped with a three-phase winding and may also be operable as a permanent magnet synchronous motor, a wound-field synchronous motor, or an induction machine. The rotating electrical machine, as illustrated in FIG. 1, includes the hollow cylindrical stator 10 and a rotor (not shown) disposed radially inside the stator 10. The rotor is disposed to be rotatable relative to the stator 10 around an axis of rotation thereof. In the following discussion, an axial direction indicates an axial direction of the stator 10 extends, in other words, a direction in which the axis of rotation of the rotor extends. A radial direction, as referred to herein, denotes a radial direction of the stator 10, in other words, a direction which passes through the center of the axis of rotation of the rotor and extends perpendicular to the axis of rotation of the rotor. A circumferential direction, as referred to herein, indicates a circumferential direction of the stator 10, in other words, a direction extending around the axis of rotation of the rotor.

Figure 2:
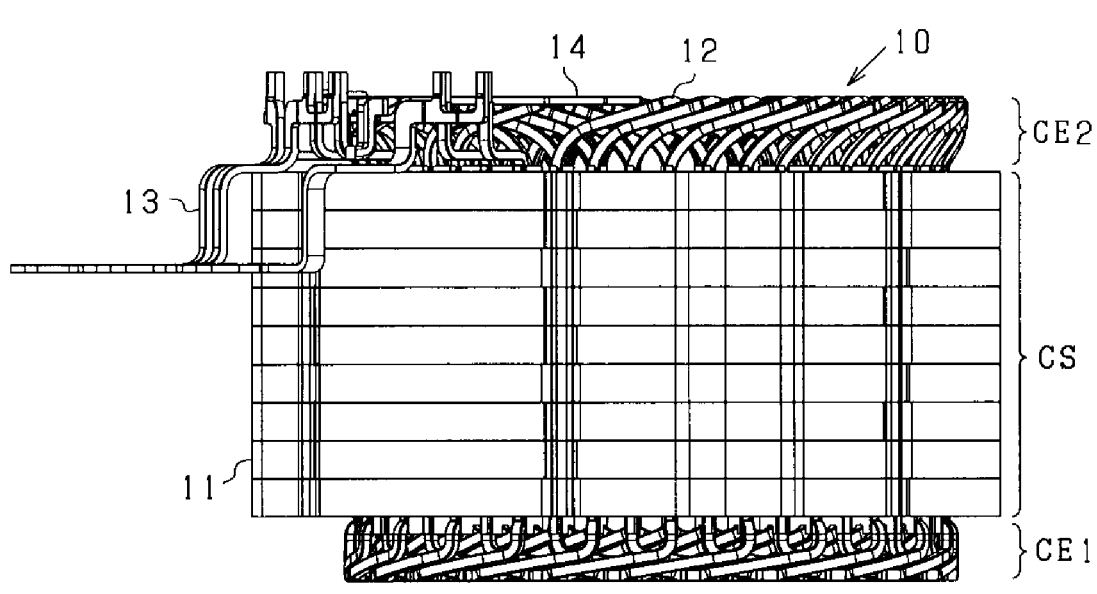
FIG. 2 is a front view of a stator in an embodiment.

The stator 10, as can be seen in FIGS. 1 and 2, includes the annular stator core 11 and the stator winding 12 wound around the stator core 11. The rotating electrical machine in this embodiment is designed as an inner-rotor rotating electrical machine which has the rotor disposed radially inside the stator 10 to be rotatable. The stator winding 12 is made of a three-phase winding including a U-phase winding, a V-phase winding, and a W-phase winding. Each of the U-phase winding, the V-phase winding, and the W-phase winding has the power bus bar 13 connected to one of ends thereof and the neutral bus bar 14 connected to the other end thereof. The stator winding 12 is made up of an in-slot coil section CS overlapping the stator core 11 in the radial direction and coil ends CE1 and CE2 lying outside the ends of the stator core 11 in the axial direction.

Figure 3:
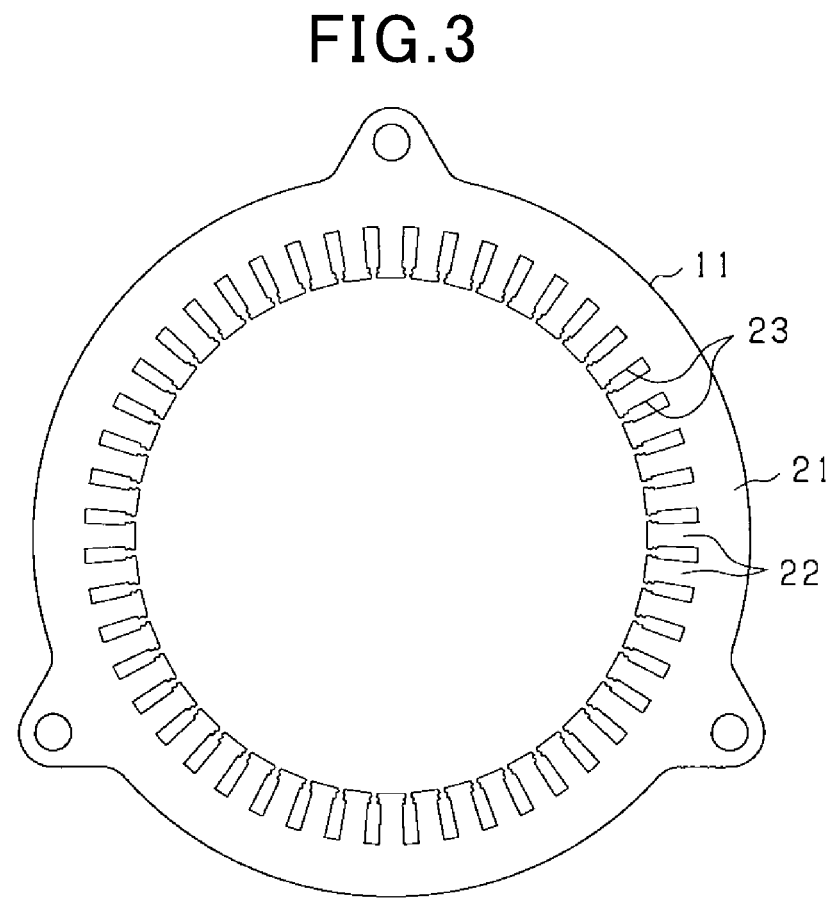

The stator core 11, as illustrated in FIG. 3, includes the annular back yoke 21 and the teeth 22 which protrude radially inward from the back yoke 21 and are arranged adjacent each other at a given interval away from each other in the circumferential direction. The stator core 11 also has formed therein the slots 23 each of which is disposed between a respective adjacent two of the teeth 22. Each of the slots 23 is shaped to have an opening which has a length extending in the radial direction. The slots 23 are arranged at equal intervals away from each other in the circumferential direction of the stator core 11. The stator winding 12 is wound in or extend through the slots 23. The stator core 11 is made of a stack of a plurality of core plates made of magnetic members, such as magnetic steel sheets.

The U-phase winding, the V-phase winding, and the W-phase winding of the stator winding 12 are connected in the form of a Y-connection (i.e., star connection). The stator winding 12 is supplied with electric power (AC power) from a power source through an inverter, not shown, to generate magnetic flux. The stator winding 12 is formed by the conductor segments 30 each of which is made of a U-shaped electrical conductor which is of a rectangular cross-section. The structure of the conductor segments 30 of the stator winding 12 will be described below in detail.

Figure 4:
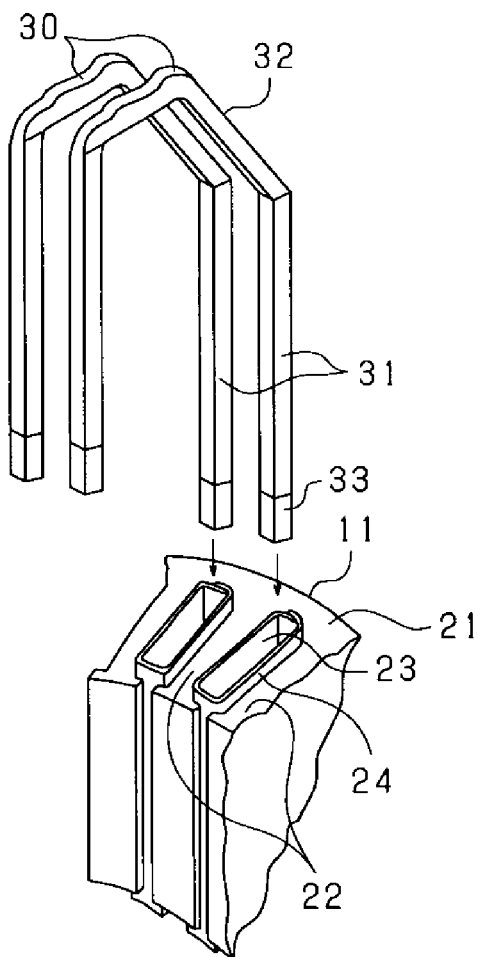
FIG. 4 is a perspective view which illustrates conductor segments of a stator winding and a portion of a stator core.

FIG. 4 is a perspective view which illustrates the conductor segments 30 and a portion of the stator core 11. Each of the conductor segments 30, as can be seen in FIG. 4, includes a pair of U-shaped straight sections 31 and the turn 32 curved or bent to connect the pair of U-shaped straight sections 31. The straight sections 31 are longer than a dimension of the stator core 11 in the axial direction, that is, the thickness of the stator core 11. Each of the conductor segments 30 is made of a flat conductor which is of a rectangular transverse section with pairs of opposed flat surfaces and covered with an insulating layer. Each of the straight sections 31 has the exposed conductive portion 33 produced by removing the insulating layer from an end thereof.

The conductor segments 30 are inserted into the slots 23 of the stator core 11 and arranged in line in the radial direction within each of the slots 23. In this embodiment, the straight sections 31 of the conductor segments 30 are disposed in the form of a stack of four layers in each of the slots 23. The straight sections 31 of each of the conductor segments 30 are arranged in two of the slots 23 which are located at a given number of coil pitches away from each other. Each of the straight sections 31 has a portion which is disposed inside the slot 23 and defines the in-slot coil section CS of the stator winding 12. Each of the slots 23 has disposed therein the insulating sheet 24 which electrically isolate the stator winding 12 (i.e., the conductor segments 30) from the stator core 11. The insulating sheet 24 is folded to enclose the conductor segments 30 disposed in the form of a four-layer stack in each of the slots 23 and held between an inner circumferential surface (i.e., an inner wall surface) of the stator core 11 and such a stack of the conductor segments 30.

The paired straight sections 31 of each of the conductor segments 30 are arranged in the two slots 23 (which will also be referred to below as first and second slots 23) at positions shifted by one layer from each other in the radial direction. For instance, one of the paired straight sections 31 is arranged at the $n^{th}$ layer position within the first slot 23 where the $n^{th}$ layer which is counted from the radially deepest (i.e., innermost) portion of the first slot 23 (i.e., from the back yoke 21) lies, while the other straight section 31 is arranged at the $(n+1)^{th}$ layer position within the second slot 23 where the $(n+1)^{th}$ layer which is counted from the radially deepest portion of the second slot 23 lies.

The installation of each of the conductor segments 30 in a respective one of the slots 23 of the stator core 11 is achieved by inserting each of the straight sections 31 into the slot 23 from a first end that is one of axially opposed ends of the stator core 11 to have an end portion thereof protruding outside a second end that is the other end of the stator core 11. This forms the coil end CE1 by the turn 32 of the conductor segment 30 on the first end of the stator core 11 and also forms the coil end CE2 on the second end of the stator core 11. The coil end CE2 is made of ends of the straight sections 31 of the conductor segments 30 inserted into two of the slots 23. Such ends are opposite ends of the straight sections 31 to the turns 32, bent in the circumferential direction, and are joined together. The coil ends CE1 and CE2 are schematically illustrated in FIG. 2. The joints of the conductor segments 30 at the coil end CE2 will be described below in detail. How to join the conductor segments 30 will first be described.

Figure 5:
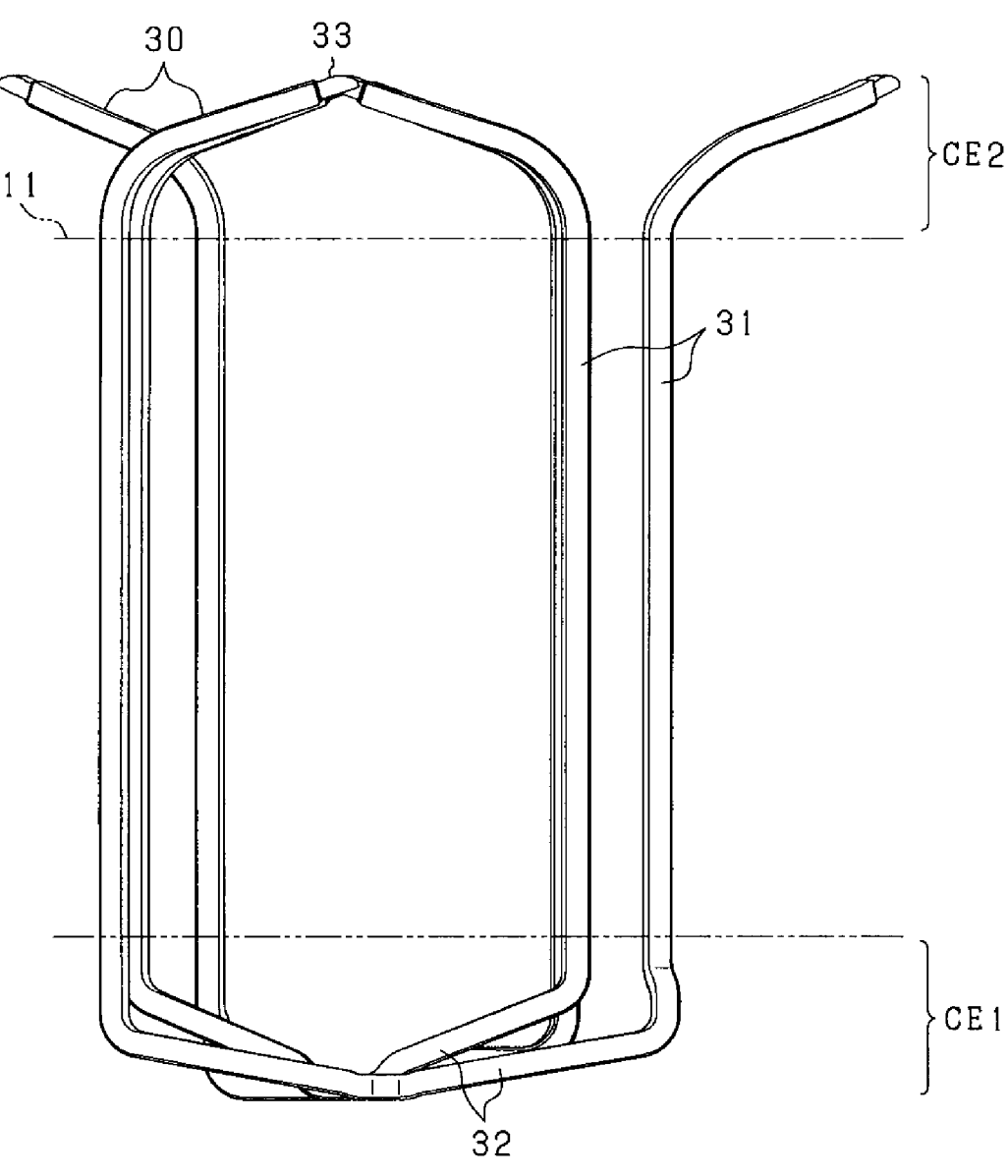
FIG. 5 is a perspective view which illustrates some of conductor segments of a stator winding which are disposed in slots of a stator core.

FIG. 5 illustrates the conductor segments 30 disposed in the slots 23. Double-dotted lines indicate the stator core 11. End portions of the paired straight sections 31 of each of the conductor segments 30 which are far away from the turn 32 protrude the end surface (i.e., upper end surface, as viewed in the drawing) of the stator core 11 are bent obliquely in the circumferential direction at a given angle to the end surface of the stator core 11. The exposed conductive portions 33 of a respective two of the conductor segments 30 are welded together, thereby connecting all the conductor segments 30 together.

The coil end CE2 is formed by joining the end of one of the conductor segments 30 which extends in a first circumferential direction outside the end of the stator core 11 with the end of one of the conductor segments 30 which extends in a second circumferential direction opposite the first circumferential direction outside the end of the stator core 11. This causes portions of the straight sections 31 of a respective two of the conductor segments 30 of the stator winding 12 to extend obliquely in the axial direction and meet together at the joint to define the coil end CE2. Some of the conductor segments 30 have the end portions of the straight sections 31 which are bent in the first circumferential direction, while the other conductor segments 30 have the end portions of the straight segments 31 which are bent away from the turn 32 in the second circumferential direction.

The U-phase, V-phase, and W-phase windings are joined together at ends thereof at a middle of the stator winding 12 and also connected at the exposed conductive portions 33 to the power bus bars 13 and the neutral bus bar 14. The structure of the neutral bus bar 14 will be described below in detail.

Figure 6:
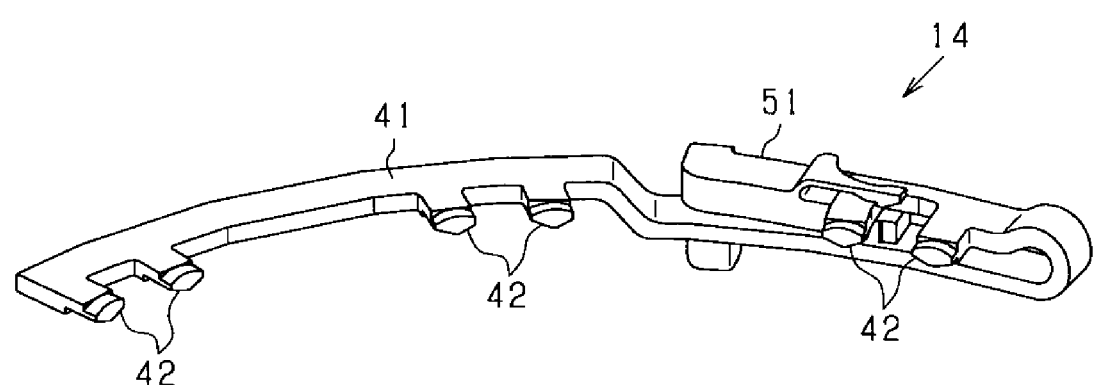
FIG. 6 is a perspective view which illustrates a neutral bus bar connecting with a stator winding.

FIG. 6 is a perspective view of the neutral bus bar 14. The neutral bus bar 14 is made of a rectangular conductor and includes the body 41 in a long plate shape and a plurality of connecting portions 42 protruding from the body 41. In this embodiment, the neutral bus bar 14 includes pairs of parallel arranged connecting portions 42, one pair for each of the U-, V-, and W-phase windings of the stator winding 12. The neutral bus bar 14, therefore, includes a total of six connecting portions 42. The neutral bus bar 14 is made of a punched flat plate. The body 41 is designed to have an arc-shaped length. After being secured to the stator winding 12, the neutral bus bar 14 is oriented to have the body 41 extending in the circumferential direction and the connecting portions 42 extending radially inward from the body 41. The connecting portions 42 have ends which face in the radial direction and connect with the ends of the V-, U-, and W-phase windings which form the coil end CE2.

The body 41 is made of an elongated strip member a substantially half of which is turned or bent to a U-shape to form a clamp in which the temperature sensor 51 is mechanically gripped. The temperature sensor 51 works to measure the temperature of the stator 10. The temperature sensor 51 is made in the form of a temperature sensor module including a thermistor and an electrical circuit.

Figure 7:
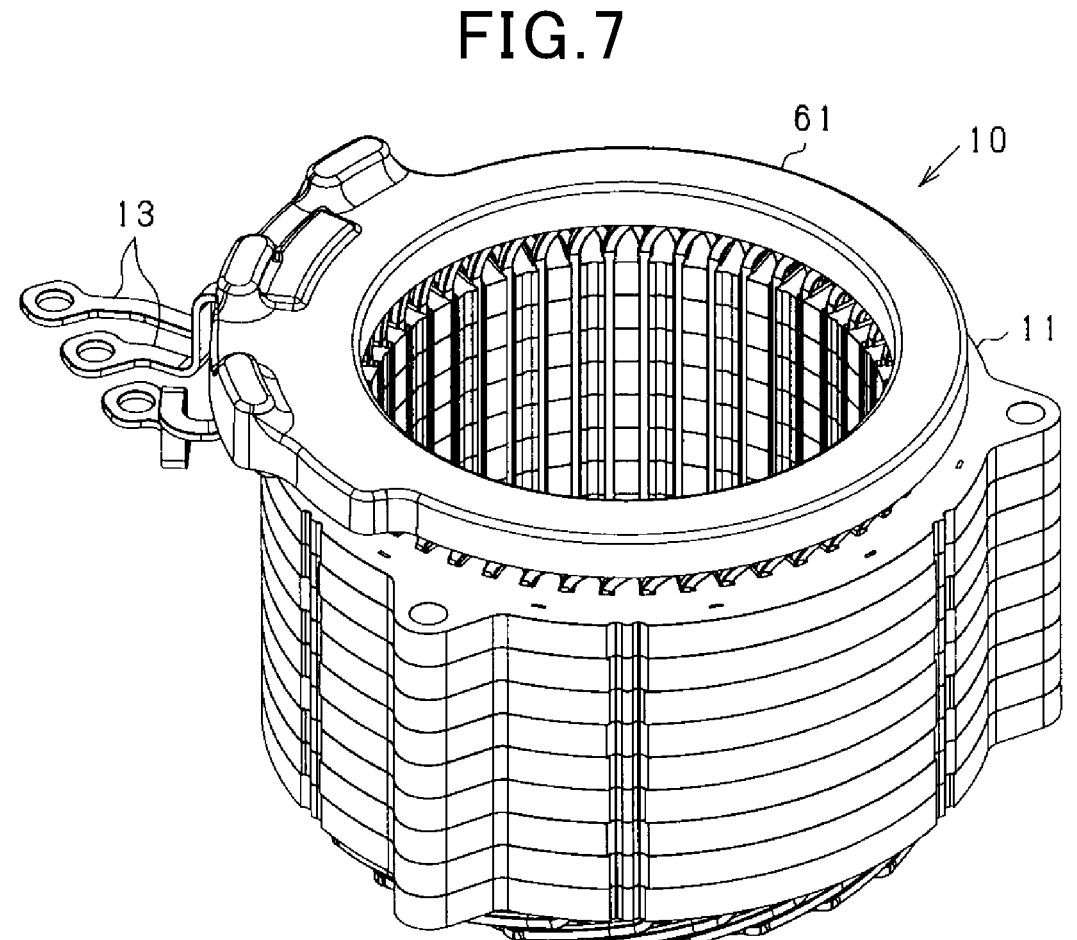
FIG. 7 is a perspective view which illustrates a stator with a resinous seal in an embodiment of this disclosure.

The stator 10, as can be seen in FIG. 7, has the resinous seal 61 which is arranged above the end of the stator core 11 and made from insulating resin electrically covering or encapsulating the coil end CE2. The resinous seal 61 is of an annular shape and encloses the welds of the conductor segments 30 and the neutral bus bar 14. The resinous seal 61 also encloses therein the temperature sensor 51 attached to the neutral bus bar 14.

The resinous seal 61 occupies an axial portion of the coil end CE2. Specifically, the resinous seal 61 is shaped to axially cover the joints or welds of the conductor segments 30 and the neutral bus bar 14 and located away from the axial end of the stator core 11, thus creating an air gap between the end surface of the resinous seal 61 which faces the stator core 11 and the end of the stator core 11. The air gap serves as a coil cooler to dissipate thermal energy from the stator winding 12. For instance, a flow of cooling medium, such as cooling oil, cooling water, or cooling air, may be created in the coil cooler to cool the stator winding 12.

Figure 8:
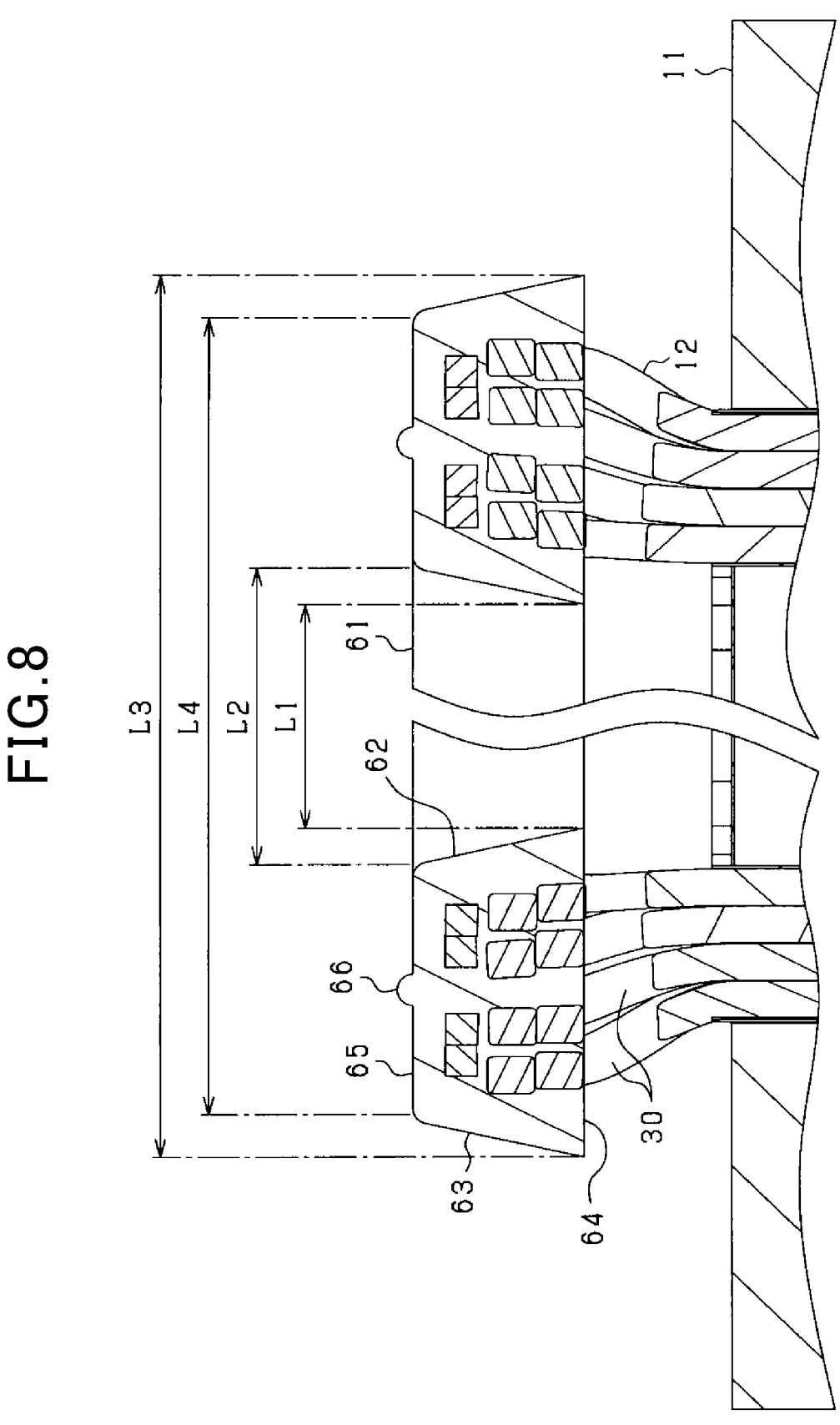
FIG. 8 is a partial vertical sectional view which illustrates a coil end of a stator.

The stator 10 is also equipped with a structure working to minimize a risk of occurrence of cracks in the end surface of the resinous seal 61. Such a structure will be described below in detail. FIG. 8 is a view which illustrates a vertical cross section of the coil end CE2 of the stator 10.

The resinous seal 61, as can be seen in FIG. 8, has the inner circumferential surface 62 which is inclined obliquely to the end surface of the stator core 11 in the form of a slant surface, in other words, extends from an upper edge of the resinous seal 61 downward close to the center axis of the stator core 11, as viewed in the drawing. This causes the inner diameter L1 of the lower edge of the inner circumferential surface 62 which is located close to the stator core 11 to be smaller than the inner diameter L2 of the upper edge of the inner circumferential surface 62 which is located farther away from the stator core 11.

The resinous seal 61 has the outer circumferential surface 63 which faces away from the inner circumferential surface 62. The outer circumferential surface 63 is inclined obliquely to the end surface of the stator core 11 in the form of a slant surface, in other words, extends from the upper edge of the resinous seal 61 downward away from the center axis of the stator core 11, as viewed in the drawing. This causes the outer diameter L3 of the lower edge of the outer circumferential surface 63 which is located close to the stator core 11 to be larger than the outer diameter L4 of the upper edge of the outer circumferential surface 63 which is located farther away from the stator core 11.

The resinous seal 61, as can be seen in FIG. 8, has the inner end surface 64 (i.e., bottom surface) which inwardly faces the stator core 11. Portions of the conductor segments 30 emerge from the inner end surface 64 of the resinous seal 61 and are inserted into the stator core 11. The insulating resin (i.e., the material) of the resinous seal 61 and the conductor segments 30, therefore, both exist near the inner end surface 64, which may cause the thickness of portions of the insulating resin which are located close to the inner circumferential surface 62 and the outer circumferential surface 63 near the inner end surface 64 to be smaller than that of a portion of the insulating resin which is located near the outer end surface 65. In order to alleviate the above drawback, the resinous seal 61 is shaped to have the inner circumferential surface 62 inclined to have the insulating resin become larger in thickness, in other words, volume thereof, toward the stator core 11, thereby ensuring a required thickness or volume of a portion of the insulating resin which is located close to the inner end surface 64 and the inner circumferential surface 62 (i.e., a portion of the material of the resinous seal 61 around an outer lower corner of the resinous seal 61). Similarly, the outer circumferential surface 63 of the resinous seal 61 is inclined to have the insulating resin become larger in thickness, in other words, volume thereof toward the stator core 11, thereby ensuring a required thickness or volume of a portion of the insulating resin (i.e., the material of the resinous seal 61) which is located close to the inner end surface 64 and the outer circumferential surface 63 (i.e., a portion of the material of the resinous seal 61 around an inner lower corner of the resinous seal 61).

The above configuration of the resinous seal 61 eliminates or minimizes a risk that the insulating resin of the resinous seal 61 may expand due to exposure to high-temperature stress when the temperature of the stator 10 is increasing, which results in thermal distortion of a portion of the insulting resin near the inner end surface 64 to induce cracks in that portion. Additionally, the configuration of the resinous seal 61 also serves to minimize a risk that cracks may occur in a portion of the insulating resin near the inner end surface 64 due to shrinkage of the insulating resin arising from a low-temperature stress when the temperature of the stator 10 is decreasing.

The resinous seal 61 has a single protrusion 66 formed on the outer end surface 65 facing away from the stator core 11. The protrusion 65 is shaped to extend in an annular shape on the outer end surface 65. The resinous seal 61 may alternatively be designed to have a plurality of protrusions 66 which are disposed away from each other on the outer end surface 65.

Figure 9:
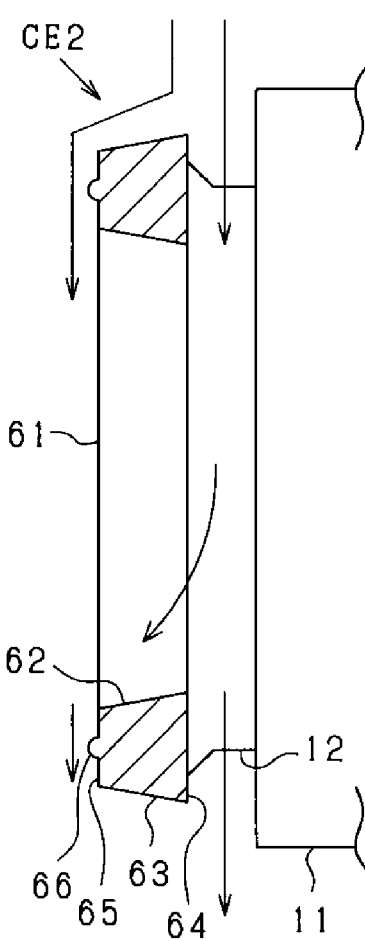
FIG. 9 is a partial sectional view which demonstrates a flow of cooling medium delivered to a coil end of a stator winding.

Next, the structure serving to cool the coil end CE2 of the stator winding 12 using cooling medium, such as lubricating oil will be described below with reference to FIG. 9. FIG. 9 illustrates how to cool the stator winding 12 when the rotating electrical machine is mounted in a vehicle with the axis thereof extending substantially in the horizontal direction. An upward or downward direction in FIG. 9 coincides with the vertical direction.

The coil end CE2 of the stator winding 12 is, as clearly illustrated in FIG. 9, supplied with a cooling medium delivered from a coolant supply mechanism, not shown, disposed vertically above the coil end CE2. The coolant supply mechanism may be installed inside a housing of the rotating electrical machine which surrounds the stator 10. For instance, the coolant supply mechanism may be implemented by an inlet opening which is formed in the housing and into which the cooling medium is delivered from an external unit arranged outside the rotating electrical machine.

The cooling medium is delivered to a gap between the resinous seal 61 and the stator core 11, thereby cooling portions of the conductor segments of the stator winding 12 which are exposed to the gap between the resinous seal 61 and the stator core 11. The inner circumferential surface 62 and the outer circumferential surface 63 of the resinous seal 61 are, as already described, each shaped in the form of an oblique surface. This causes the cooling medium to be guided to the outer end surface 65 both through the outer circumferential surface 63 and through the inner circumferential surface 62 of the resinous seal 61. The outer end surface 65, as described above, has the protrusion 66 serving as a heat dissipator or heat sink. In other words, the outer end surface 65 works as a heat releasing surface which facilitates the dissipation of thermal energy from the resinous seal 61. The cooling ability of the resinous seal 61 is, therefore, enhanced by the inner circumferential surface 62 and the outer circumferential surface 63 which are obliquely inclined to direct the flow of cooling medium toward the outer end surface 65.

The outer end surface 65 may alternatively designed to have a recess(s) instead of the protrusion 66 as long as it serves to enhance the cooling ability of the outer end surface 65.

Figure 10:
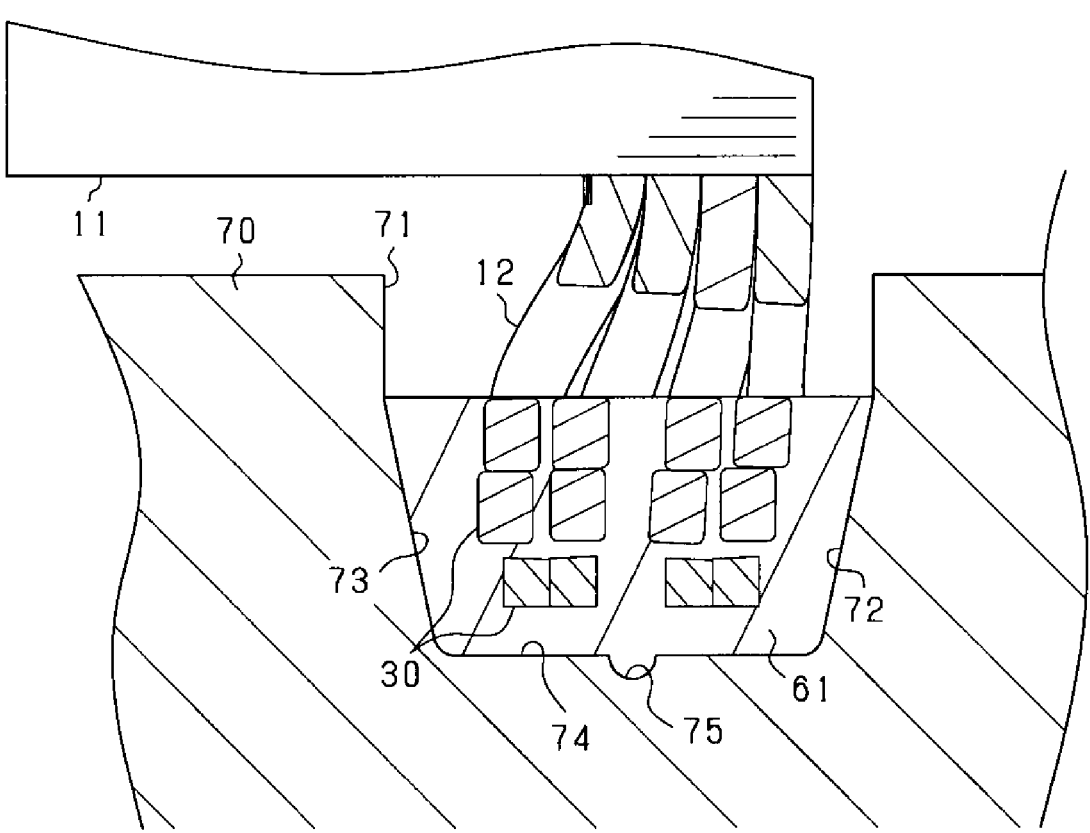
FIG. 10 is a partial sectional view which illustrates how to form a resinous seal on a coil end of a stator winding.

FIG. 10 is a view which represents how to form the resinous seal 61 on the coil end CE2.

The mold 70 includes the annular groove 71 (i.e., mold cavity) into which liquid resin material is injected. The groove 71 has the inner peripheral wall surface 72, the outer peripheral wall surface 73, and the bottom 74. The bottom 74 has the recess 75 formed therein. The inner peripheral wall surface 72 of the mold 70 is used to form the inner circumferential surface 62 of the resinous seal 61. Similarly, the outer peripheral wall surface 73 is used to form the outer circumferential surface 63 of the resinous seal 61. The wall surfaces 72 and 73 are, therefore, shaped in the form of oblique surfaces which are inclined relative to the axis of the stator winding 12.

In a process of forming the formation of the resinous seal 61, the coil end CE2 is put into the groove 71 into which the resin material has been injected. The resinous seal 61 is then completed. Specifically, the coil end CE2 is oriented to face downward in the vertical direction and then immersed into the resin material in the groove 71. Afterwards, the resin material is hardened to complete the resinous seal 61. Alternatively, the coil end CE2 may be first disposed in the groove 71 after which the molten resin material may be injected int the groove 71.

The above embodiment offers the following beneficial advantages.

The inner circumferential surface 62 of the resinous seal 61 is, as described above, shaped to have the inner diameter L1 closer to the stator core 11 and the inner diameter L2 farther away from the stator core 11. The inner diameter L1 is smaller than the inner diameter L2, thereby resulting in an increase in thickness or volume of a radially inner portion of the insulating resin which is also close to the end surface of the resinous seal 61 which faces the stator core 11. This eliminates or minimizes a risk that the insulating resin of the resinous seal 61 may expand due to exposure to high-temperature stress when the temperature of the stator 10 is increasing, which results in thermal distortion of a radially inner portion of the insulting resin near the end surface of the resinous seal 61 facing the stator core 11 to induce cracks in that portion. This ensures the stability in insulation of the conductor segments 30 of the stator winding 12 within the resinous seal 61 to secure a required degree of insulation of the stator winding 12.

Additionally, the outer circumferential surface 63 of the resinous seal 61 is also shaped to have the outer diameter L3 closer to the stator core 11 and the outer diameter L4 farther away from the stator core 11. The outer diameter L3 is larger than the outer diameter L4, thereby resulting in an increase in thickness or volume of a radially outer portion of the insulating resin which is also close to the end surface of the resinous seal 61 which faces the stator core 11. This minimizes a risk that cracks may occur in a radially outer portion of the insulating resin near the end surface of the resinous seal 61 facing the stator core 11 due to shrinkage of the insulating resin arising from a low-temperature stress when the temperature of the stator 10 is decreasing. This also ensures the stability in insulation of the conductor segments of the stator winding 12 within the resinous seal 61.

In brief, the configuration of the resinous seal 61 serves to avoid generation of cracks both in the radially inner portion of the resinous seal 61 close to the stator core 11 due to the exposure to a high-temperature stress and in the radially outer portion of the resinous seal 61 close to the stator core 11 due to the exposure to a low-temperature stress. This keeps the electrical insulation of the stator winding 12 at a required level.

The rotating electrical machine is usually mounted in place with the annular shaped planes of the coil end CE2 and the resinous seal 61 oriented vertically. The inner circumferential surface 62 of the resinous seal 61 is in the shape of an oblique surface which is inclined to have a first portion close to the stator core 11 and a second portion farther away from the stator core 11. The first portion is closer to the axis of the stator core 11 than the second portion is. Such a configuration of the inner circumferential surface 62 of the resinous seal 61 causes the cooling medium which has been delivered to the inner circumferential surface 62 to flow along the slope of the inner circumferential surface 62 to a portion of the resinous seal 61 which is remote from the stator core 11. The resinous seal 61, as described above, has the outer surface which is remote from the stator core 11 and serves as a heat dissipating surface with the protrusion(s) 66 or the recess(s). When the cooling medium passes the heat dissipating surface, the resinous seal 61 works to release thermal energy, as transmitted from the stator winding 12, to the cooling medium, thereby alleviating the thermal stress to which the resinous seal 61 is subjected, thereby minimizing a risk of occurrence of cracks in the resinous seal 61.

Modifications

Modifications of the rotating electrical machine will be described below.

Figure 11:
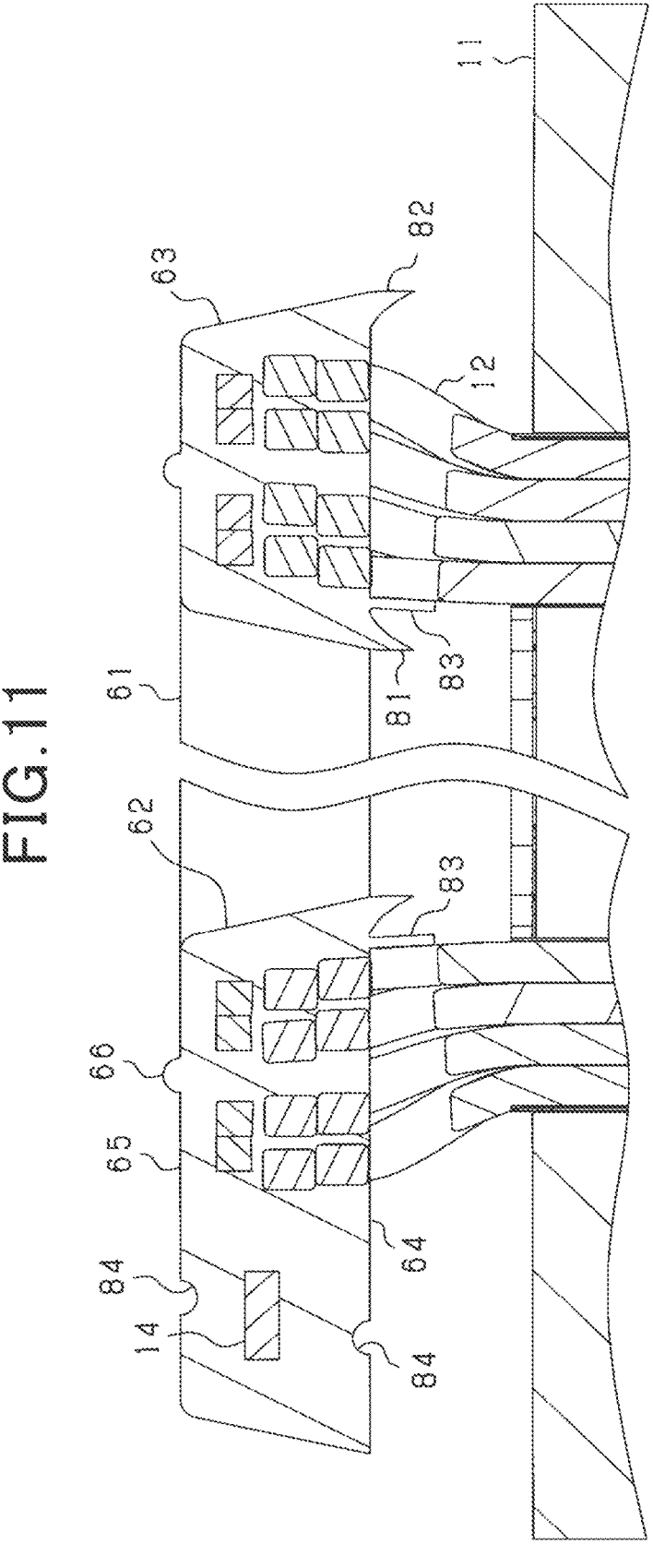
FIG. 11 is a partial longitudinal sectional view which illustrates a coil end of a stator winding and a portion of a stator around the coil end.

The inner end surface 64 of the resinous seal 61, as illustrated in FIG. 11, may be designed to have the wedge-shaped protrusion 81 formed on a radially inner edge thereof and the wedge-shaped protrusion 82 formed on a radially outer edge thereof. Each of the protrusions 81 and 82 is of an annular shape extending along the circumference of the inner end surface 64. The radially inner protrusion 81 is smaller in diameter than the radially outer protrusion 82. When the resinous seal 61 is, as shown in FIG. 9, placed with the annular shaped plane thereof oriented vertically, it will cause the cooling medium, as delivered from above, to pass through a gap between the protrusions 81 and 82, so that it flows in the circumferential direction of the resinous seal 61. The protrusions 81 and 82 serve as stoppers to hold the cooling medium, as having entered a gap or flow path between the resinous seal 61 and the stator core 11, from flowing out of the flow path, thereby facilitating flow of the cooling medium along the entire circumference of the res-inous seal 61 and also enhancing accumulation of the cooling medium around the resinous seal 61, which improves the cooling ability of the resinous seal 61.

Each of the protrusions 81 and 82 may alternatively be designed to have a cut formed in a portion of the circum-ference thereof or made of a plurality of discrete sections separate from each other through a gap as long as each of the protrusions 81 and 82 protrudes from the inner end surface 64 toward the stator core 11 and extends in the circumfer-ential direction of the resinous seal 61.

The inner end surface 64 of the resinous seal 61, as illustrated in FIG. 11, may have the thin film-shaped mem-ber 83 serving as a heat dissipating fin which protrudes from the inner end surface 64 and extends along or in contact with the surfaces of the conductor segments 30, thereby resulting in an increase in entire resinous area of the inner end surface 64 to enhance the cooling ability of the resinous seal 61.

In the structure of FIG. 11, the neutral bus bar 14 is arranged radially outside the coil end CE2 of the stator winding 12 and enclosed by the resinous seal 61 along with the stator winding 12. The resinous seal 61, therefore, has a first resinous portion covering the coil end CE2 and a second resinous portion covering the neutral bus bar 14 (which will also be referred to as a bus bar-sealing portion). The second resinous portion expands radially outside the first resinous portion and has formed on or in an outer surface thereof a protrusion(s) or a recess(es) serving as a heat dissipator. Specifically, the inner end surface 64 and the outer end surface 65 of the resinous seal 61 have the recesses 84 and 84 formed therein, thereby enhancing the dissipation of heat from a portion of the resinous seal 61 other than the first resinous portion covering the coil end CE2.

The outer surface of the resinous seal 61 may have a recess(es) formed by an air bubble(s) emerging outside the outer surface when the insulating resin of the resinous seal 61 is being hardened in the molding process. The resinous seal 61 also includes a third resinous portion which encap-sulates the power bus bar 13 and may be designed to have a protrusion(s) or a recess(es) formed thereon or therein which serves as a heat dissipator.

Figures 12A, 12B, 12C, 12D:
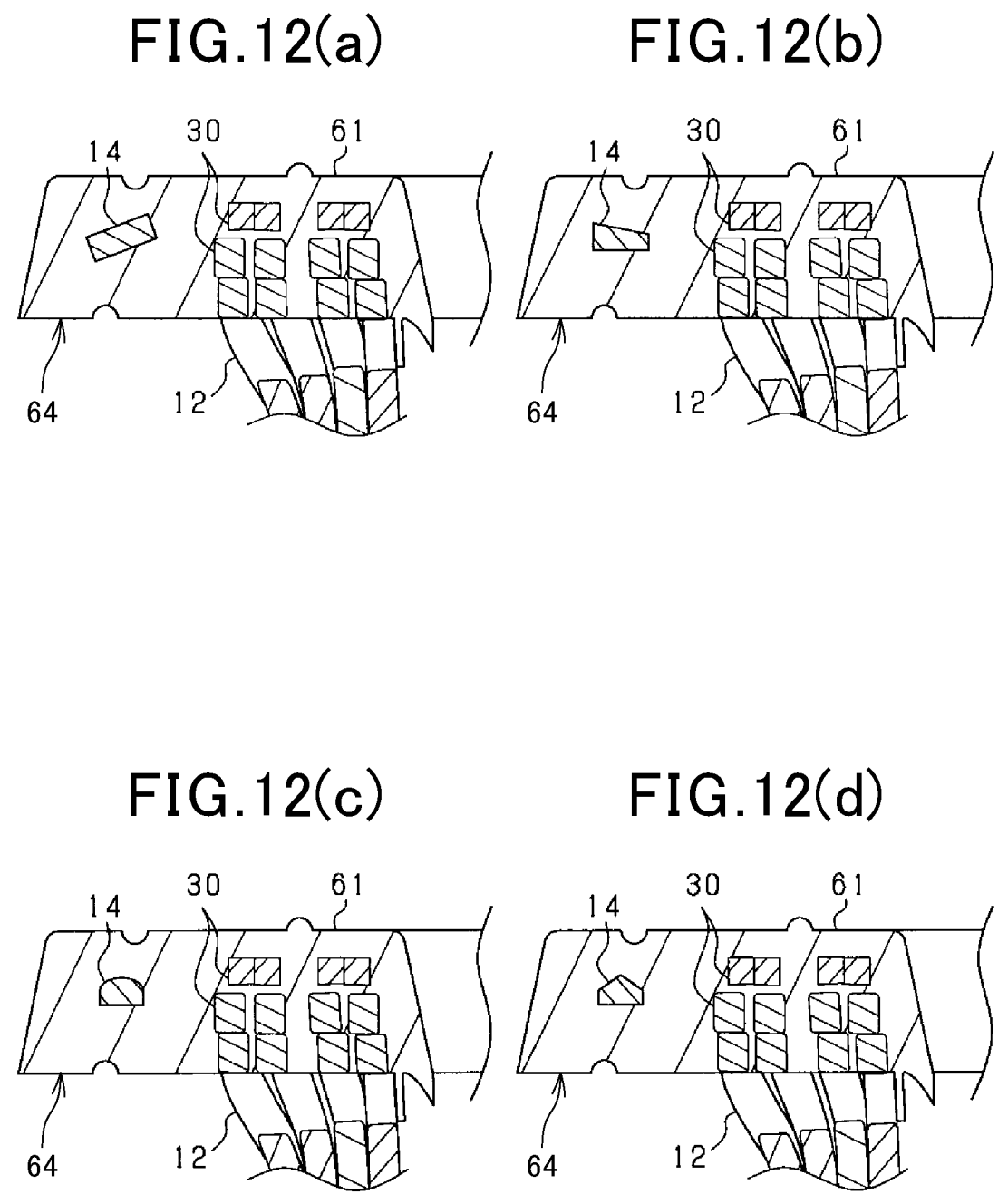

The neutral bus bar 14 may alternatively be arranged in the resinous seal 61 in any one of modified ways illustrated in FIGS. 12(*a*) to 12(*d*).

In FIG. 12(*a*), the neutral bus bar 14 is disposed within the resinous seal 61 with the body 41 inclined to be oblique at an angle excluding zero to the inner end surface 64 of the resinous seal 61.

In FIG. 12(*b*), the neutral bus bar 14 is disposed within the resinous seal 61 with the body 41 oriented to have an upper major surface, as viewed in the drawing, which is inclined to be oblique at an angle (excluding zero) to the inner end surface 64 of the resinous seal 61. In other words, the upper major surface of the neutral bus bar 14 corresponds to a vertically lower surface thereof in an orientation of the resinous seal 61 during a production process thereof.

In FIG. 12(*c*), the body 41 of the neutral bus bar 14 has the upper major surface, as viewed in the drawing, which protrudes upward in a dome shape. The upper major surface of the neutral bus bar 14, as described above, corresponds to the vertically lower surface thereof in an orientation of the resinous seal 61 during a production process thereof.

In FIG. 12(*d*), the body 41 of the neutral bus bar 14 has the upper major surface, as viewed in the drawing, which protrudes upward in a triangular or ridge-shape. The upper major surface of the neutral bus bar 14, as described above, corresponds to the vertically lower surface thereof in an orientation of the resinous seal 61 during a production process thereof.

The structure in each of FIGS. 12(*a*) to 12(*d*) minimizes a risk that air bubbles may remain in or on the surface of the neutral bus bar 14 during the production of the resinous seal 61, thereby avoiding a reduction in thermal conductivity arising from the air bubbles in or on the surface of the neutral bus bar 14 within the resinous seal 61, which will lead to a drop in efficiency for cooling the conductor segments 30.

Figure 13A:
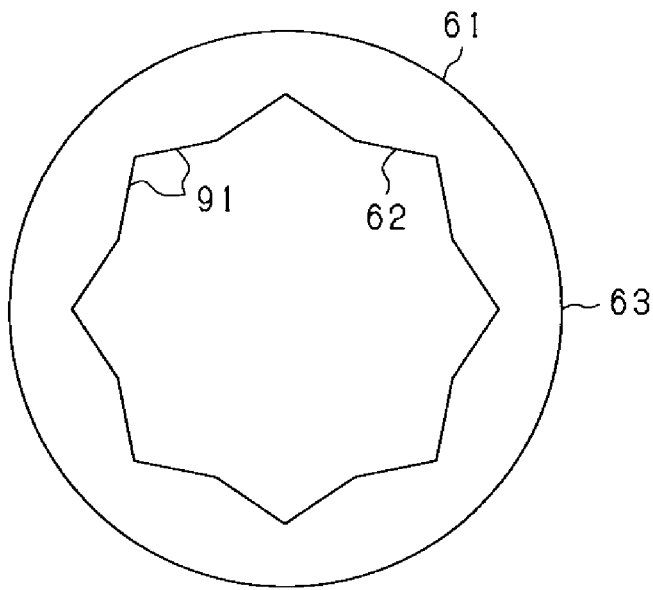
FIGS. 13(*a*) and 13(*b*) are views which illustrate modified forms of an inner circumferential surface of a resinous seal.
Figure 13B:
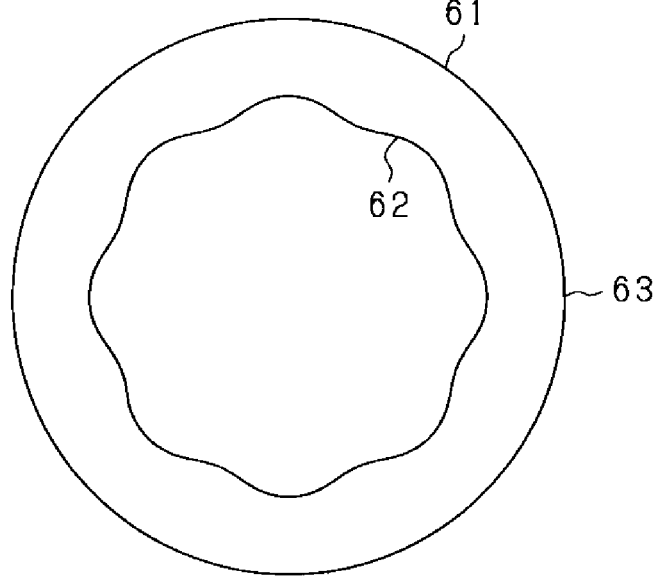

The inner circumferential surface 62 of the resinous seal 61 may alternatively be, as illustrated in FIG. 13(*a*), shaped to have formed thereon a plurality of protrusions 91 which bulge radially inward and are arranged at a given interval away from each other in the circumferential direction of the resinous seal 61. The inner circumferential surface 62 is inclined to be close both to the stator core 11 and to the central axis of the stator core 11 and has concave portions and convex portions (i.e., the protrusions 91) facing in the radial direction. This spreads elastic deformation of the resinous seal 61, as arising from the thermal stress thereon, in the circumferential direction as well as in the radial direction of the resinous seal 61, thereby minimizing a risk of occurrence of cracks in the end surface of the resinous seal 61 which faces the stator core 11.

The inner circumferential surface 62 of the resinous seal 61 may alternatively be, as illustrated in FIG. 13(*b*), formed in a wave-shape with gently curved concave and convex portions which are arranged alternately adjacent each other. This spreads elastic deformation of the resinous seal 61, as arising from the thermal stress thereon, in the circumferen-tial direction as well as in the radial direction of the resinous seal 61, thereby minimizing a risk of occurrence of cracks in the end surface of the resinous seal 61 which faces the stator core 11. The wave shape of the inner circumferential surface 62 also minimizes a risk of breakage of the resinous seal 61 arising from the concentration of stress on the inner circum-ferential surface 62.

The inner circumferential surface 62 of the resinous seal 61 is, as described above, inclined linearly to have the first inner diameter L1 close to the stator core 11 and the second inner diameter L2 which is farther away from the stator core 11 and larger than the first inner diameter L1, but however, may alternatively be shaped stepwise to have formed thereon an inner shoulder which isolates the inner circum-ferential surface 62 into two sections having inner diameters different from each other. Similarly, the outer circumferen-tial surface 63 of the resinous seal 61 may alternatively be shaped stepwise to have formed thereon an outer shoulder isolating it into two sections: a first section close to the stator core 11 and a second section farther away from the stator core 11 which have outer diameters different from each other. Specifically, the first section has the first outer diam-eter L3. The second section has the second outer diameter L4 which is smaller than the first outer diameter L3.

The stator winding 12 in the above embodiment is made up of the discrete conductor segments 30 joined together, but however, may alternatively be made of a continuous wire wound in the slots 23 of the stator core 11 in the form of a wave winding.

What is claimed is:

1. A stator for a rotating electrical machine comprising:
   a stator core;
   a stator winding which is disposed on or in the stator core and has a coil end exposed outside an end of the stator core; and
   a resinous seal which is in an annular shape and covers an axial end portion of the coil end with an insulating resin,
   the resinous seal has an inner circumferential surface facing radially inward thereof, the inner circumferential surface being shaped to have a first inner diameter close to the stator core and a second inner diameter farther away from the stator core, the first inner diameter being smaller than the second inner diameter, wherein
   the stator is disposed in a rotating electrical machine, an axis of the rotating electrical machine being oriented in a horizontal direction, the coil end of the stator being cooled by a cooling medium delivered from a position vertically above the coil end to the coil end,
   the inner circumferential surface of the resinous seal is inclined such that it slopes radially inward relative to a center axis of the stator core from a first edge of the resinous seal to a second edge of the resinous seal, the first edge being farther from the stator core than the second edge,
   the resinous seal has an outer surface facing away from the stator core, the outer surface having at least one of a protrusion and a recess serving as a heat dissipator, and
   the protrusion or the recess serving as the heat dissipator being positioned in a path of the cooling medium,
   an outer circumferential surface of the resinous seal is inclined such that it slopes radially outward relative to a center axis of the stator core from a third edge of the resinous seal to a fourth edge of the resinous seal, the third edge being farther from the stator core than fourth edge,
   the outer circumferential surface serves to direct the cooling medium toward the protrusion or the recess serving as the heat dissipator,
   the resinous seal and the stator core define therebetween the cooling path into which the cooling medium enters from above the stator to cool portions of the stator winding which are exposed to the cooling path, and
   the inner circumferential surface of the resinous seal leads a portion of the cooling medium from the cooling path between the resinous seal and the stator core to flow along the inner circumferential surface and to redirect toward the protrusion or the recess serving as the heat dissipator located on the outer surface of the resinous seal.

2. The stator as set forth in claim 1, wherein the resinous seal has an outer circumferential surface facing radially outward thereof, the outer circumferential surface being shaped to have a first outer diameter close to the stator core and a second outer diameter farther away from the stator core, the first outer diameter being larger than the second outer diameter.

3. The stator as set forth in claim 1, wherein the resinous seal has an end surface which faces the stator core and has protrusions formed on a radially inner edge and a radially outer edge which protrude toward the stator core and extend in a circumferential direction of the resinous seal.

4. The stator as set forth in claim 1, further comprising a bus bar which connects with the coil end of the stator winding and is arranged to face the coil end in a radial direction of the stator winding, and
   the resinous seal is configured to have a bus bar-sealing portion which covers the coil end and the bus bar using the insulating resin wherein
   the protrusion or the recess serving as the heat dissipator is formed in or on an outer surface of the bus bar-sealing portion.

5. The stator as set forth in claim 1, wherein the inner circumferential surface of the resinous seal is shaped to have formed thereon a plurality of protrusions which bulge radially inward and are arranged at a given interval away from each other in the circumferential direction of the resinous seal.

6. The stator as set forth in claim 1, wherein the inner circumferential surface of the resinous seal is formed in a wave-shape with curved concave and convex portions which are arranged alternately.

7. The stator as set forth in claim 1, wherein
   the stator defines a first cooling path between the resinous seal and the stator core through which cooling medium flows to cool exposed portions of the stator winding, and a second cooling path along the outer surface of the resinous seal where the heat dissipator is positioned, and
   the inner circumferential surface of the resinous seal redirects a portion of the cooling medium from the first cooling path to the second cooling path.

8. The stator as set forth in claim 1, wherein the resinous seal has an end surface facing the stator core and has protrusions formed on a radially inner edge and a radially outer edge which protrude toward the stator core, the protrusions extending axially beyond portions of the stator winding that contact the resinous seal.

\* \* \* \* \*